UNITED STATES PATENT OFFICE.

ROBERT AMBROSE WALTON, OF SHAWNEETOWN, ILLINOIS.

IMPROVEMENT IN MEDICINES FOR THE CURE OF DIARRHEA.

Specification forming part of Letters Patent No. 115,547, dated May 30, 1871.

*To all whom it may concern:*

Be it known that I, ROBERT AMBROSE WALTON, of Shawneetown, in the county of Gallatin, in the State of Illinois, have invented a new Remedy for the Cure of Chronic Diarrhea, Diarrhea, and similar affections; and I do hereby declare that the following is a full and exact description thereof, reference being had to the accompanying simple ingredients and the medicine compounded.

The medicine is composed of the following ingredients and proportions: Twenty-five drops tincture opium; three tea-spoonfuls crushed sugar; one tea-spoonful grated nutmeg; two ounces brandy.

This is the proportion for a dose of the medicine, and will relieve the worst case of diarrhea in fifteen minutes, and will cure it in two days.

This medicine is to be known as WALTON'S diarrhea remedy.

R. A. WALTON.

Witnesses:
C. O. EDWARDS,
HARRISON WISEHEART.